United States Patent
Li et al.

(10) Patent No.: US 12,267,379 B2
(45) Date of Patent: Apr. 1, 2025

(54) SYSTEM AND METHOD OF COMMUNICATIONS USING PARALLEL DATA PATHS

(71) Applicant: Huawei Technologies Co., Ltd., Shenzhen (CN)

(72) Inventors: Jian Li, Waltham, MA (US); Han Su, Ann Arbor, MI (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/361,504

(22) Filed: Jul. 28, 2023

(65) Prior Publication Data
US 2024/0022620 A1 Jan. 18, 2024

Related U.S. Application Data

(63) Continuation of application No. PCT/US2021/016036, filed on Feb. 1, 2021.

(51) Int. Cl.
*H04L 65/75* (2022.01)
*H04L 65/61* (2022.01)

(52) U.S. Cl.
CPC ............ *H04L 65/762* (2022.05); *H04L 65/61* (2022.05)

(58) Field of Classification Search
CPC ............ H04L 65/762; H04N 21/23418; H04N 21/26603; H04N 21/235
See application file for complete search history.

(56) References Cited

U.S. PATENT DOCUMENTS

| | | | | |
|---|---|---|---|---|
| 10,091,295 | B1 * | 10/2018 | Savic | G06F 16/25 |
| 2006/0251321 | A1 * | 11/2006 | Kryeziu | H04N 19/20 |
| | | | | 375/E7.076 |
| 2008/0183757 | A1 * | 7/2008 | Dorogusker | G06Q 30/0241 |
| 2017/0347110 | A1 * | 11/2017 | Wang | H04N 19/142 |
| 2018/0146198 | A1 * | 5/2018 | Atluru | H04N 19/167 |
| 2018/0234726 | A1 * | 8/2018 | Allstead, Jr. | H04L 65/612 |

(Continued)

FOREIGN PATENT DOCUMENTS

| | | |
|---|---|---|
| CA | 3088533 | 1/2021 |
| EP | 2793479 | 10/2014 |

OTHER PUBLICATIONS

International Preliminary Report on Patentability dated Aug. 10, 2023, International Application No. PCT/US2021/016036.

(Continued)

*Primary Examiner* — David R Lazaro
(74) *Attorney, Agent, or Firm* — Pearl Cohen Zedek Latzer Baratz LLP

(57) ABSTRACT

The present technology discloses communication in a communications network. A source node receives a media file from a client device in the communications network. Contextual information in the file is obtained that is descriptive of content in the medial file. When a match to the media file is found, the contextual information is accessed from storage. Otherwise, the contextual information is generated by the source node by extracting attributes from metadata in the media file. The media file is then transmitted over a first data path, and the contextual information is transmitted over a second data path, where the first data path has a higher latency than the second data path such that the contextual information arrives at the destination node prior to the media file.

20 Claims, 7 Drawing Sheets

(56) References Cited

U.S. PATENT DOCUMENTS

| | | | |
|---|---|---|---|
| 2019/0147221 A1* | 5/2019 | Grabner | G06T 7/75 |
| | | | 382/103 |
| 2021/0084389 A1* | 3/2021 | Young | H04N 21/8547 |
| 2021/0158048 A1* | 5/2021 | Lee | G06F 18/22 |
| 2021/0327470 A1* | 10/2021 | Hooper | G11B 27/031 |
| 2023/0300346 A1* | 9/2023 | Atluru | H04N 19/70 |
| | | | 375/240.02 |
| 2024/0022620 A1* | 1/2024 | Li | H04N 21/8133 |

OTHER PUBLICATIONS

International Search Report and Written Opinion dated Oct. 25, 2021, International Application No. PCT/US2021/016036.
Iannucci, Peter A. et al., "Fused Low-Earth-Orbit GNSS", Sep. 25, 2020, pp. 1-15.
Iannucci, Peter A. et al., "Economical Fused LEO GNSS", IEEE 2020, pp. 1-18.
Light Reading, "Huawei sets out its stall for 5.5G", Nov. 13, 2020, pp. 1-7.

* cited by examiner

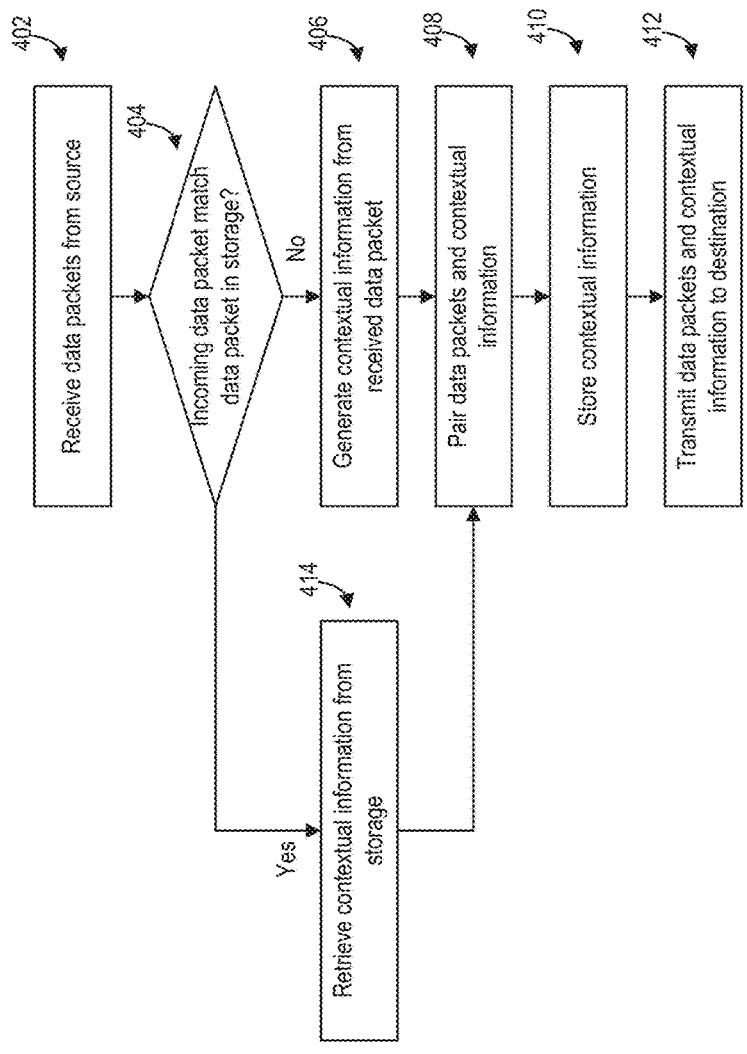

SYSTEM AND METHOD OF COMMUNICATIONS USING PARALLEL DATA PATHS

CLAIM OF PRIORITY

This application is a continuation of, and claims priority to, PCT Patent Application No. PCT/US2021/016036, entitled "SYSTEM AND METHOD OF COMMUNICATIONS USING PARALLEL DATA PATHS" filed Feb. 1, 2021, which application is incorporated by reference herein in its entirety.

FIELD

This disclosure generally relates to communications in a communications network.

BACKGROUND

A communication network is a large distributed system for receiving information and transmitting the information to a destination. Over the past few decades, the demand for provisions including high data rate, low-latency, communications services has dramatically increased. Although conventional wire and fiber landlines, cellular networks, and geostationary satellite systems have continuously been increasing to accommodate the growth in demand, the existing communication infrastructure is still not large enough (or fast enough) to accommodate the increase in demand. In addition, some areas of the world are not connected to a communication network and therefore cannot be part of the global community where everything is connected to the internet.

SUMMARY

According to one aspect of the present disclosure, there is a computer-implemented method of communication in a communications network, comprising receiving, by a source node, a first media file from a client device in the communications network, the media file including audio and/or video data; obtaining, by the source node, contextual information that is descriptive of content in the audio and/or video data of the media file, by accessing the contextual information when a match to the media file is found in storage at the source node; or generating the contextual information by extracting attributes from metadata in the media file when no match is found in the storage at the source node; and transmitting, by the source node to a destination node, the media file over a first data path and the contextual information over a second data path, wherein the first data path has a higher latency than the second data path such that the contextual information arrives at the destination node prior to the media file.

Optionally, in any of the preceding aspects, the obtaining comprises determining whether the media file received at the source node matches a second media file previously received at the source node, when the media file matches the second media file, accessing the contextual information, and when the media file does not match the second media file, generating the contextual information.

Optionally, in any of the preceding aspects, the media file includes a first signature, and the second media file includes a second signature; the accessing further comprising comparing, by the source node, the first signature to the second signature; determining, by the source node, the media file matches the second media file when the first signature matches the second signature; and retrieving the contextual information from storage at the source node when the first signature matches the second signature.

Optionally, in any of the preceding aspects, the method further comprises storing the contextual information in the storage at the source node.

Optionally, in any of the preceding aspects, the generating further comprises translating, by the source node, the extracted attributes from the metadata of the media file into the contextual information using at least one of a speech-to-text, computer vision or encoding methodology.

Optionally, in any of the preceding aspects, the method further comprising pairing, by the source node, the media file and the contextual information for simultaneous transmittal across the first data path and the second data path.

Optionally, in any of the preceding aspects, the first data path has high throughput and high latency, and the second data path has low throughput and low latency.

Optionally, in any of the preceding aspects, the first data path is a wired network, and the second data path is in a wireless network.

Optionally, in any of the preceding aspects, the first data path includes a terrestrial data path and the second data path includes an aerial data path.

Optionally, in any of the preceding aspects, the terrestrial data path includes at least one of a fiber optic data path, a cellular data path, a digital subscriber line (DSL) data path, a cable internet based data path, or a wireless local area network data path.

Optionally, in any of the preceding aspects, the aerial data path comprises a source ground station, a constellation of communication devices orbiting earth and in communication with the source ground station, and a destination ground station in communication with the constellation of communication devices orbiting the earth in which to receive the contextual information transmitted from the source node.

Optionally, in any of the preceding aspects, the aerial data path includes at least one of a low earth orbit satellite data path, a medium earth orbit satellite data path, or a geostationary earth orbit satellite data path.

According to another aspect of the present disclosure, there is a computer-implemented method of communication in a communications network, comprising receiving, by a destination node, a media file and contextual information from a source node in the communications network, the media file including audio and/or video data and received over a first data path and the contextual information received over a second data path, wherein the first data path has a higher latency than the second data path such that the contextual information arrives prior to the media file; predicting, by the destination node, contextual information in media file by reconstructing the media file based on the contextual information obtained from storage at the destination node when a match to the media file is located in the storage; or generating the contextual information by extracting attributes from metadata in the media file and reconstructing the media file based on the generated contextual information when no match to the media file is located in storage at the destination node; and transmitting, by the destination node, the reconstructed media file to a client device.

According to a further aspect of the disclosure, there is a non-transitory computer-readable medium storing computer instructions at a source node for communicating in a communications network, that when executed by one or more processors, cause the one or more processors to perform the steps of receiving a media file from a client device in the communications network, the media file including audio and/or video data; obtaining contextual information that is descriptive of content in the audio and/or video data of the media file, by accessing the contextual information when a match to the media file is found in storage at the source node; or generating the contextual information by extracting attributes from metadata in the media file when no match is found in the storage at the source node; and transmitting, to a destination node, the media file over a first data path and the contextual information over a second data path, wherein the first data path has a higher latency than the second data path such that the contextual information arrives at the destination node prior to the media file.

According to still a further aspect of the disclosure, there is a non-transitory computer-readable medium storing computer instructions at a destination node for communicating in a communications network, that when executed by one or more processors, cause the one or more processors to perform the steps of receiving a media file and contextual information from a source node in the communications network, the media file including audio and/or video data and received over a first data path and the contextual information received over a second data path, wherein the first data path has a higher latency than the second data path such that the contextual information arrives prior to the media file; predicting contextual information in media file by reconstructing the media file based on the contextual information obtained from storage at the destination node when a match to the media file is located in the storage; or generating the contextual information by extracting attributes from metadata in the media file and reconstructing the media file based on the generated contextual information when no match to the media file is located in storage at the destination node; and transmitting the reconstructed media file to a client device.

According to yet another aspect of the disclosure, there is a source node for communicating in a communications network, comprising a non-transitory memory storage comprising instructions; and one or more processors in communication with the memory, wherein the one or more processors execute the instructions to receive a media file from a client device in the communications network, the media file including audio and/or video data; obtain contextual information that is descriptive of content in the audio and/or video data of the media file, by accessing the contextual information when a match to the media file is found in storage at the source node; or generating the contextual information by extracting attributes from metadata in the media file when no match is found in the storage at the source node; and transmit, to a destination node, the media file over a first data path and the contextual information over a second data path, wherein the first data path has a higher latency than the second data path such that the contextual information arrives at the destination node prior to the media file.

According to still another aspect of the disclosure, there is a destination node for communicating in a communications network, comprising a non-transitory memory storage comprising instructions; and one or more processors in communication with the memory, wherein the one or more processors execute the instructions to receive a media file and contextual information from a source node in the communications network, the media file including audio and/or video data and received over a first data path and the contextual information received over a second data path, wherein the first data path has a higher latency than the second data path such that the contextual information arrives prior to the media file; predict contextual information in media file by reconstructing the media file based on the contextual information obtained from storage at the destination node when a match to the media file is located in the storage; or generating the contextual information by extracting attributes from metadata in the media file and reconstructing the media file based on the generated contextual information when no match to the media file is located in storage at the destination node; and transmit the reconstructed media file to a client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 4A illustrates an example flow chart of extracting contextual information from a source.

FIG. 4B illustrates an example incoming data packet and a table of data packets stored at the source node.

DETAILED DESCRIPTION

Figure 1:
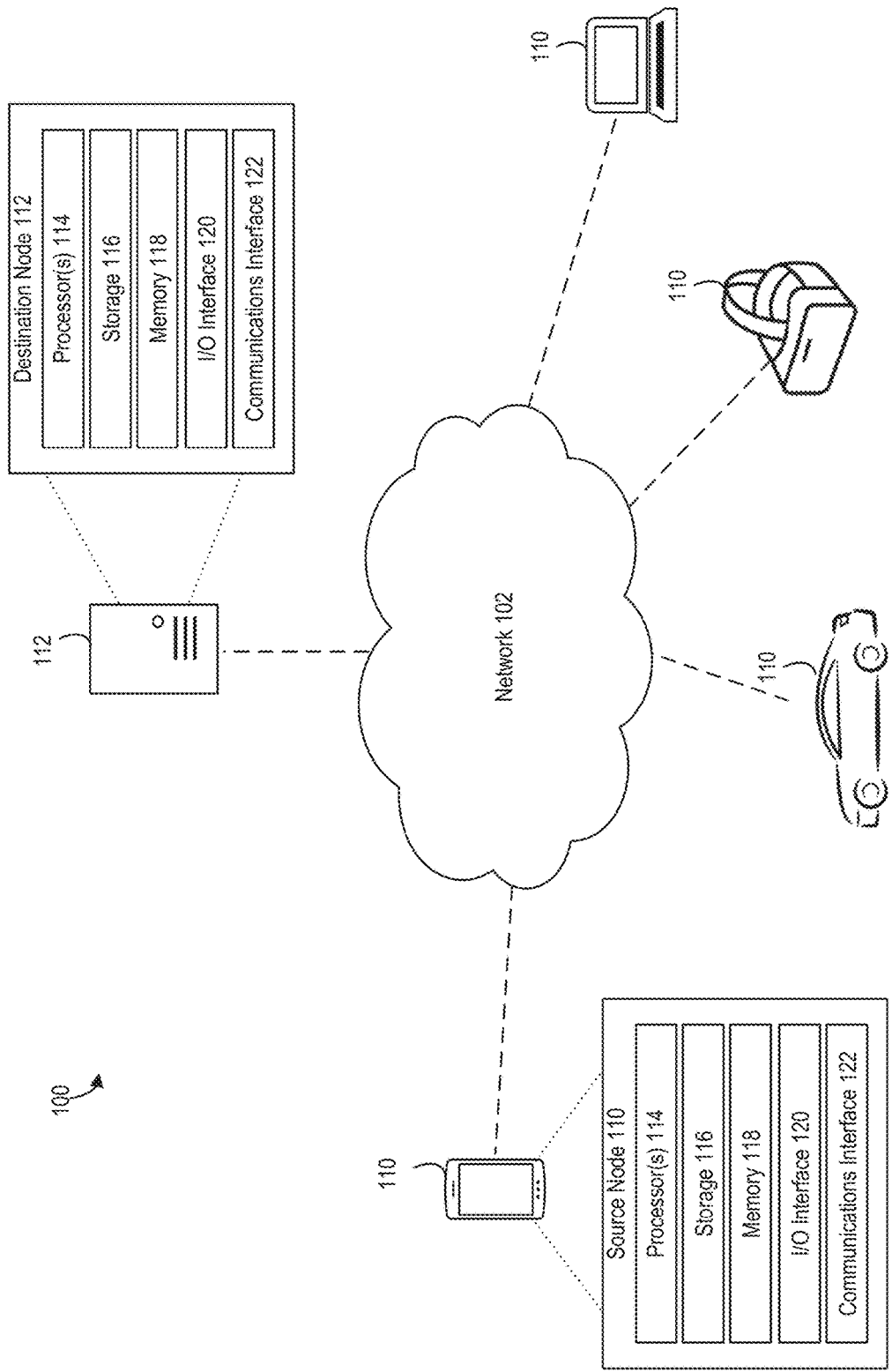
FIG. 1 illustrates an example system that can be used to implement the methods and systems of the present disclosure.

The present disclosure will now be described with reference to the figures, which generally relate to transmission of data in a network.

Commercial broadband Internet services using a constellation of satellites in Low Earth Orbit (LEO) have been increasingly helpful in providing services with a global reach, low latency, and wide bandwidth. However, these services often fail to satisfy the high bandwidth requirements of many applications, while maintaining sufficiently low latency and high precision positioning. Many large-scale applications, particularly in the post-5G era, will require stringent communication protocols, such as uplink centric broadband communication (UCBC), which delivers a ten-time increase in uplink bandwidth, real-time broadband communication (RTBC), which affords provisions for high-bandwidth and low-latency scenarios for immersive experiences that support AR, VR, XR and holographic apps, and harmonized communication and sensing (HCS), which connects autonomous cars and civilian drones requiring high reliability and precision positioning.

The present technology seeks to reduce the latency of high bandwidth communications transmitted in networks such that the latency is unnoticeable in applications such as video conferencing, gaming, and other immersive apps. At the same time, the disclosed technology provides the necessary high bandwidth requirements and precision positioning that meets industry and user expectations. In one embodiment, a data packet to be transmitted over the network is split into different sets of information for transmission over different data paths. The first set of information is contextual (or critical) information that is extracted from the corresponding raw data in the data packet received by a source. This contextual information may be extracted, for example, using metadata in the data packet or retrieved from storage at the source. The second set of information is the data packet, which includes the raw data. In one embodiment, the contextual information is descriptive of content in the data packet. For example, a data packet may be a media file that contains audio and/or video data. The contextual information may describe the content of the audio and/or video data in the media file. The contextual information may be sent over a first data path and the data packet (e.g., media file) may be sent over a second data path, where the first data path has a latency and bandwidth that is lower than the second data path. Since the contextual information is sent over a lower latency data path, and includes a smaller amount of data, it will typically arrive at a destination before the corresponding data packet. The period between arrival of the contextual information and the corresponding data packet is referred to as a "transmission gap." During this transmission gap, the contextual information may be used to predict the corresponding data packet (or parts of the data packet) prior to its arrival at the destination. In one embodiment, if the lower latency, lower bandwidth network is unavailable, another network may provide a data path as a fallback provision.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications, and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates an example system that can be used to implement the methods and systems of the present disclosure. The system 100 uses a client-server architecture that includes one or more source nodes 110 that communicate with one or more destination nodes 112 over a network 102. For example, the source nodes 110 and destination node 112 may communicate over the public Internet using the Internet Protocol (IP). In one embodiment, the source nodes 110 are client devices and the destination nodes 112 are servers.

In one embodiment, the source nodes 110 and destination node 112 may be implemented using a processor(s) 114, storage 116, memory 118, input/output (I/O) interface 120 and communications interface 122. The communications interface 122 can include any suitable components for interfacing with one or more networks 102, including for example, transmitters, receivers, ports, controllers, antennas, or other suitable components. In some embodiments, one or more of components may be combined or omitted (e.g., combine storage and memory). In some embodiments, the source nodes 110 or destination node 112 may include other components not combined or included in the depicted embodiment (e.g., location circuitry, sensing circuitry detecting the device environment, a power supply, or a bus), or several instances of the components as illustrated.

The processor 114 can include any suitable processing device, such as a microprocessor, microcontroller, integrated circuit, logic device, or other suitable processing device. For example, processor 114 may be used to run operating system applications, firmware applications, media playback applications, media editing applications, or any other application. In other embodiments, the processor 114 may drive a display and process inputs received from a user interface.

The storage 116 may include, for example, one or more storage mediums including a hard-drive, solid state drive, flash memory, permanent memory such as ROM, any other suitable type of storage component, or any combination thereof. The storage 116 may store, for example, media data (e.g., music and video files), application data (e.g., for implementing functions on a client device), firmware, authentication information (e.g., libraries of data associated with authorized users), wireless connection information (e.g., information that may a client device to establish a wireless connection), and any other suitable data or any combination thereof.

The memory 118 may be computer-readable media, including, but not limited to, non-transitory computer-readable media, RAM, ROM, hard drives, flash drives, or other memory devices. The memory 118 can store information accessible by the processor 114, including computer-readable instructions that can be executed by the processor 114. In some embodiments, memory 118 can also be used for storing data used to operate electronic device applications, or any other type of data that may be stored in storage 116. In some embodiments, memory 118 and storage 116 may be combined as a single storage medium.

The I/O interface 120 may provide inputs to input/output circuitry of the source nodes 110 or destination node 112. Input/output interface 120 may include any suitable input interface, such as for example, a button, keypad, dial, a click wheel, or a touch screen. In some embodiments, the source nodes 110 or destination node 112 may include a capacitive sensing mechanism, or a multi-touch capacitive sensing mechanism. In some embodiments, input interface can include a microphone or other audio input interface for receiving a user's voice inputs. The input interface can include an analog to digital converter for converting received analog signals corresponding to a voice input to a digital signal that can be processed and analyzed to identify specific words or instructions.

In some embodiments, input/output interface 120 can instead or in addition include one or more interfaces for providing an audio output, visual output, or other type of output (e.g., haptic output). For example, input/output interface 120 can include one or more speakers (e.g., mono or stereo speakers) built into the source nodes 110 or destination node 112, or an audio connector (e.g., an audio jack or an appropriate Bluetooth connection) operative to be coupled to an audio output mechanism. Input/output interface 120 may be operative to provide audio data using a wired or wireless connection to a headset, headphones, or earbuds. As another example, input/output interface 120 can include display circuitry (e.g., a screen or projection system) for providing a display visible to the user. The display can include a screen (e.g., an LCD screen) that is incorporated into the source nodes 110 or destination node 112, a movable display or a projecting system for providing a display of content on a surface remote from the source nodes 110 or destination node 112 (e.g., a video projector), or any other suitable display.

Communications circuitry 122 can be operative to create or connect to a communications network, such as network 102. Communications circuitry 122 can be capable of providing wireless communications using any suitable short-range or long-range communications protocol. For example, communications circuitry (not shown) can support Wi-Fi (e.g., an 802.11 protocol), Bluetooth™, radio frequency systems (e.g., 1200 MHz, 2.4 GHz, and 5.6 GHz communication systems), infrared, protocols used by wireless and cellular phones and personal email devices, or any other protocol supporting wireless communications. Communications circuitry 122 may instead or in addition be capable of providing wired communications, for example using any suitable port on one or both of the devices (e.g., 30-pin, USB, FireWire, Serial, or Ethernet).

In one embodiment, the source nodes 110 can exchange data with other source nodes 110 and/or the destination node 112 over the network 102. In one embodiment, a subset of the source nodes 110 are connected or in communication with another source node 110 and/or the destination node 112. Each of the source nodes 110 can be any suitable type of computing device, such as a general purpose computer, special purpose computer, laptop, desktop, mobile device, navigation system, smartphone, tablet, wearable computing device, gaming console, a display with one or more processors, or other suitable computing device. The source nodes 110 may also be any system and/or device that can establish a connection, including wired, wireless, cellular connections with another device. For example, a source node 110 may be a vehicle communicating with other source nodes 110 and/or destination node 112 via network 102.

The network 202 can be any type of communications network, such as a local area network (e.g., intranet), wide area network (e.g., Internet), cellular network, or some combination thereof. The network 102 can also include a direct connection between a source node 110 and other client devices 110 and/or the destination node 112 (or more than one server). In general, communication between the source node 110 and the destination node 112 or other source nodes 110 can be carried via network interface using any type of wired and/or wireless connection, using a variety of communication protocols (e.g., TCP/IP, HTTP, SMTP, FTP), encodings or formats (e.g., HTML, XML), and/or protection schemes (e.g., VPN, secure HTTP, SSL). Wired network connections may include, but are not limited to, optical fiber, cable, ethernet, etc.

In some embodiments, a wired connection may be used for global communication, such as communication across an ocean or continent. For example, subsea cable systems such a Grace Hopper™, Curie™, Dunant™ and Equiano™ connect continents along the ocean floor. These systems allow for increased bandwidth and reliability for global communications, while also enabling better movement of traffic across large distances. While wired connections typically provide high bandwidth solutions, they often have a lower latency when compared to their wireless counterparts simply due to the laws of physics.

Figure 2:
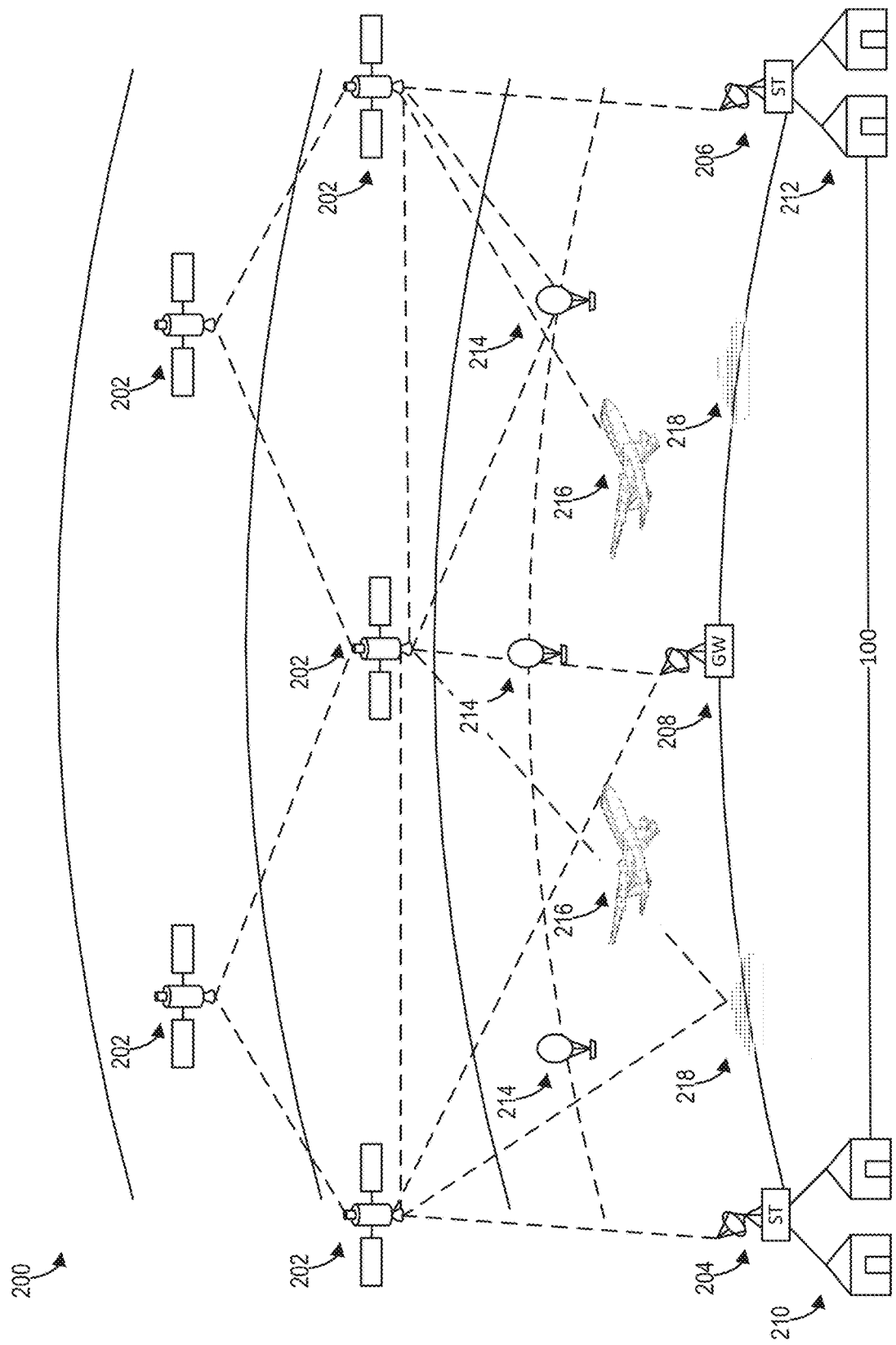
FIG. 2 illustrates an example of a global communication system that can be used to implement the methods and systems of the present disclosure.

FIG. 2 illustrates an example of a global communication system that can be used to implement the methods and systems of the present disclosure. Embodiments described herein relate to communication systems that use wireless optical communication between satellites in a satellite constellation to provide high-speed communication in space. In addition to, or as part of, the system 100 in FIG. 1, the global communication system 200 includes satellites 202 and gateways. Gateways (GWs) may include, for example, source ground stations 204, destination ground stations 206, and optionally linking-gateways or linking-ground stations 208, or a moving linking-gateway (e.g., positioned on a moving object, such as a balloon 214, an airplane 216, a boat 218, etc.). It is appreciated that any number of satellites 202, ground stations (or subscriber terminals ST), and gateways may be part of the global communication system 200, and that the disclosure is not limited to the depicted embodiment.

As defined herein, a subscriber terminal or ground station may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile.

In one embodiment, satellite 202 comprises a bus (e.g., spacecraft) and one or more payloads (e.g., the communication payload, an imaging payload, etc.). The satellite may also include a command and data handling system and multiple power sources, such as batteries, solar panels, and one or more propulsion systems, for operating the bus and the payload. The command and data handling system can be used, e.g., to control aspects of a payload and/or a propulsion system, but is not limited thereto.

A satellite 202 may orbit the earth in Low Earth Orbit (LEO), Medium Earth Orbit (MEO) or High Earth Orbit (HEO), including Geosynchronous Earth Orbit (GEO). The satellite 202 includes an antenna that receives a communication from a source ground station, such as source ground station 204, and reroutes the communication signal to a destination ground station, such as destination ground station 20. The global communication system 200 may also include a data processing device (not shown) that processes the received communication and determines a data path of the communication to arrive at the destination ground station 206, via linking-ground station 208. In one embodiment, as described further below, the data path of the communication is determined based on the type of data that is being transmitted. For example, a smaller amount of data may be transmitted over a low latency, low throughput data path (such as characterized by an aerial network), whereas a larger amount of data may be transmitted over a high latency, high throughput data path (such as characterized by a terrestrial system). For example, a data path including a constellation of LEO satellites 202 may be a low latency, low throughput data path, whereas another data path may include system 100 that is a high latency, high throughput data path.

In one embodiment, the source ground station 204 is in communication with a user 210 through a cabled, a fiber optic, or a wireless radio-frequency connection, and the destination ground station 206 is in communication with another user 212 through a cabled, a fiber optic, or a wireless radio-frequency connection. In some examples, the communication between the source ground station 204 and the user 210 or the communication between the destination ground station 206 and a user 212 is a wireless communication (either radio-frequency or free-space optical). As defined herein, a user may also refer to a source node 110 or destination node 112, as shown in FIG. 1.

In global communications, users 210 and 212 are often in a different location and separated by large distances. For example, in the depicted embodiment, a communication is transmitted over a large distance from the user 210 through the global communication system 200 to reach the user 212 at its destination. Therefore, it is desirable to have a global communication system capable of routing communication signal traffic over long distances such as across an ocean or on different continents. It is also desirable to provide a reduced latency and high bandwidth system that provides the benefits of higher bandwidth cable and lower latency microwave signals. It is also appreciated that while the embodiments of the disclosure focus on long distances during global communications, the system may also be employed for shorter and localized communications and is not limited to larger distance communication.

With continued reference to FIG. 2, the satellites 202 of the global communication system 200 may be divided into one or more groups, where each group includes one or more satellites 202. In some examples, each group includes one or more orbital paths or trajectories where each orbital path or trajectory includes multiple satellites 202 spaced from one another. In some examples, the global communication system 200 includes a first group of satellites 202 and a second group of satellites 202. The first group (upper group) of satellites 202 orbit the earth at a first altitude, and the second group (lower group) of satellites 202 orbit the earth at a second altitude. As shown, the first group of satellites 202 is at an altitude that is greater than the second group of satellites 202. The satellites 202 may be orbiting the earth within the LEO orbit, MEO orbit, GEO orbit or HEO orbit. Other groups of satellites with different orbiting altitudes may also be deployed, although not shown.

In some examples of a constellation of satellites 202, the balloons 214 act as a linking-gateway. As shown, a first satellite 202 in a first plane 216 and a second satellite 202 in a second plane 216 are able send a communication between one another, without the additional antennas and hardware required, by utilizing the linking-gateways to relay or retransmit the signal from the first satellite 202 to the second satellite 202. In one embodiment, the linking-gateway is (or on) any one of a balloon 214, an airplane 216, a boat 216, or a stationary device on land. In further examples, the constellation of balloons 214 use the linking-gateways to link a first balloon 214 in a first plane 216 with a second balloon 214 in a second plane 214 using a linking-gateway. In some examples, the satellites 202 act as linking-gateways.

Figure 3A:
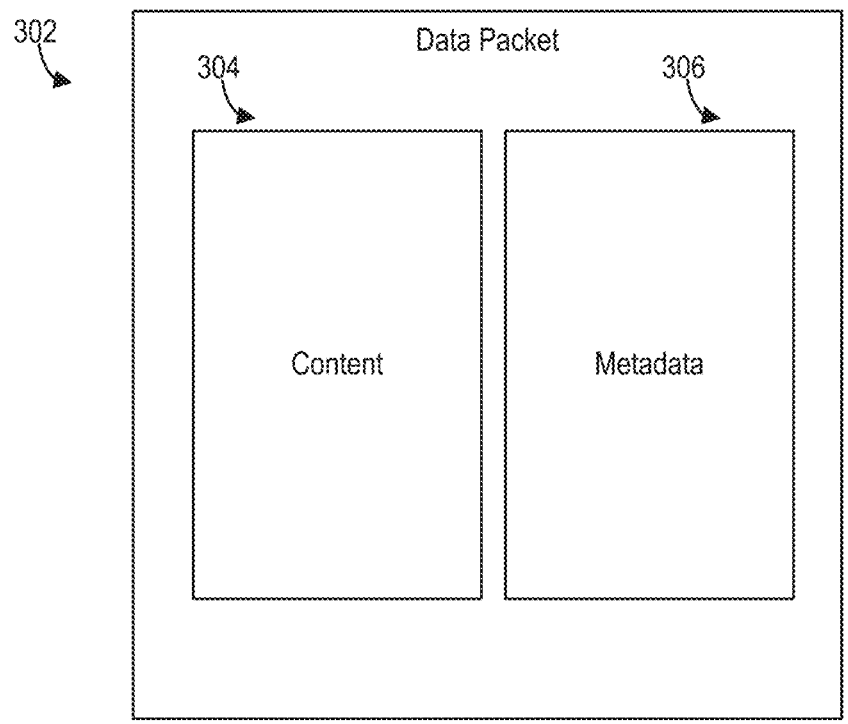
FIG. 3A illustrates and example of a data packet that may be sent and received from a source to a destination in accordance with embodiments of the disclosure.

FIG. 3A illustrates and example of a data packet that may be sent and received from a source to a destination in accordance with embodiments of the disclosure. Data packet 302 can include data content 304 and metadata 306 associated with the data. Data packets 302 can include any suitable type of data, including for example text, numerical, image, video, audio, or combinations of these. In one implementation, data packet 302 can include a media file or media played back by a device, or media captured by a device. In one embodiment, media files can include content. Content 304 can include image, video, or audio tracks that can be played back separately or simultaneously, or can be edited or modified independently or simultaneously. Each track can be encoded using any suitable approach, including for example using primary frames (e.g., I-frames) and secondary frames (e.g., P or B-frames), or a sequence of full frames (e.g., individual audio sequences).

In one embodiment, the content 304 can be associated with different metadata 306 for cataloging, indexing, and searching. Metadata 306 can be associated with content 304 using known techniques. For example, metadata 306 can be stored as part of the data packet 302 that includes the content 304 (e.g., metadata forms a header in a file of the data packet). As another example, metadata 306 can be stored in a separate location from the content 304. More specifically, metadata 306 can be stored in a metadata file (e.g., one file for each instance of content), a database (e.g., metadata database within an electronic device or a particular application), remote location (e.g., a remote server), or any other suitable location. If the metadata 306 is stored separately from the content 304, the metadata 306 can be associated with the content 304 using any suitable approach, including for example one or more references in the metadata and/or content, pointers, links, or other combinations of these.

In some embodiments, metadata 306 can instead of or in addition to include metadata 306 that is content-based (i.e., content-based metadata). This metadata can characterize attributes (e.g., frequency of voice, pixels quality of an image, etc.) about the content. For example, a device can analyze the content of data, and extract attributes about the content 304. These attributes and metadata together may be used to for the contextual information about the data packets. That is, the extracted attributes may be descriptive of the content of data in the data packet. Such metadata 306 can include, for example, color analysis or profile, voice recognition outputs, facial recognition outputs, object recognition outputs, information describing landmarks in the data, stabilization information, or any other information extracted from the content 304 (e.g., the media content) of the data packet 302. The content-based metadata 306 can be generated at any suitable time and using any suitable device. In some cases, the device generating the content can analyze the content as it is captured to extract the content-based metadata 306.

In other embodiments, metadata 306 can instead of or in addition to include metadata entered or defined by the user. For example, a user can add metadata 306 in one or more fields associated with data packet 302 and content 304. As another example, a user can modify an automatically generated metadata field in the data packet 302. For example, the user can enter any suitable metadata for stored content.

When a device, such as the source node 110 or destination node 112, accesses the content 304, the device can review the metadata 306 associated with the data packet content 304. For example, the device can identify the types of metadata 306 that are associated with content 304 by determining the categories or fields of metadata 306 for which metadata 306 is available. In some embodiments, it may be desirable to have metadata 306 in at least a threshold or minimum set of metadata categories. For example, it may be desirable to include metadata 306 depicting the location or people shown in an image or video. As another example, it may be desirable to include metadata 306 used for classifying the data (e.g. location, people, event, or timing metadata).

Figure 3B:
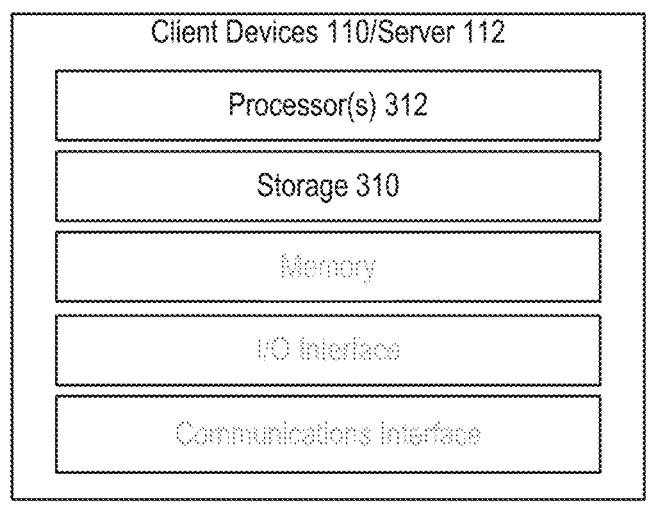
FIG. 3B illustrates example components for managing metadata in accordance with one embodiment.

Any suitable component, process, or module of the source node 110 or server 112 can associate the metadata 306 with the content 304. FIG. 3B illustrates example components for managing metadata in accordance with one embodiment. For example, the processor 312 in a device may be operative to control the association of metadata 306 with content 304 of the data packet 302. For example, processor 312 can define links or pointers between metadata 306 and content 304. In one embodiment, the processor 312 can be implemented as part of the source node 110 or destination node 112, including for example as part of processing circuitry, memory, storage, or combinations of these. In some embodiments, the processor 312 can direct other device components to perform one or more specific operations for retrieving metadata 306.

The processor 312 can retrieve specific content 304 from storage 310. Storage 310 can include any suitable local or remote storage, including for example storage accessed over a network (e.g., web-based storage or storage provided as part of a social network). In one embodiment, memory may be used instead of or in addition to the storage 310.

In some embodiments, the metadata 306 can be automatically generated by the device capturing or generating the content 304 or by a device used to access the content 304. However, in some instances, the device may not have the capabilities required to generate the metadata 306. It may therefore be desirable for the processor 312 to automatically add the metadata 306 to the content 304. For example, the processor 312 can identify different sources from which to retrieve the metadata 306. In some embodiments, the processor 312 can go through a progression of sources to find metadata 306. For example, the processor 312 can look at information available from a user's client device or from other electronic devices used by the user. In another example, the processor 312 can connect to one or more social networks used by the user to retrieve information from the one or more social networks (e.g., from metadata associated with data provided by the user's friends on the social network). In still another example, the processor 312 can connect to one or more remote sources and search for other data that may be related to the particular data for which additional metadata is desired.

During implementation, the processor 312 can determine attributes of the content 304 or generate or recreate the content 304 based on the available metadata 306. For purposes of discussion, the content 304 will be captured video, though it will be understood that features of the description can apply to any other type of data or content. The processor 312 can review the available metadata 306 provided with the content (in this case, a video), and compare the available metadata 306 with other information available to the device to extract, from the other information, additional metadata 306 for the video.

The processor 312 can extract additional metadata 306 from any suitable application or application data of the device. For example, the processor 312 can determine a location and people who may be in the video from a calendar entry identified from date and time metadata 321. As another example, the processor 312 can analyze one or more frames of the video to detect faces, and compare the detected faces with known faces of a photo or video management application. As still another example, the processor 312 can analyze one or more frames to detect a particular landmark, displayed text (e.g., a document, a street sign, or a store sign), or other recognizable content 304. The detected text or landmark can be compared to addresses, business names, or contact information (e.g., telephone numbers) known to the device, for example from an address book or history of addresses entered in a mapping application (e.g., a map website). As still yet another example, the processor 312 can process and analyze audio in the video to extract voice prints that can be compared to a library of known voice prints associated with contacts of a user's address book.

FIG. 4A illustrates an example flow chart of extracting contextual information from a source. In the discussion that follows, the source node 110, including processor 114, performs the procedures. However, it is appreciated that any other functional unit or processing unit may implement the processes described herein, and the disclosure is not limited to implementation by the source node and processor.

The source node 110 is generally responsible for extracting contextual information from data packets (e.g., media files) received by a source using pre-computation techniques, and dispatching (transmitting) the extracted contextual information and the corresponding data packet through parallel data paths. In one embodiment, the source may be an application executing or residing on the source node 110 that generates or provides an output. For example, the application may be a recorder that generates or provides voice streams, a media application that generates or provides video frames, or a word processing application that generates or provides textual information. Other examples of a source include, but are not limited to, sensors, media devices (such as set top boxes, streaming media devices, gaming systems, VR or AR devices), user generated data, content-based data, web browsers, etc.

A system or components of a system that are contextually-aware generally refers to the ability of the system and/or the system components to gather information about the environment and automatically collect and analyze data to guide an output. Context about data includes any information that is relevant to a given entity, such as a person, a device, or an application. As such, contextual information falls into a wide range of categories including time, location, device, identity, user, role, privilege level, activity, task, process, and nearby devices/users. Sources of information may additionally include, but are not limited to, sensor generated data, user generated data, content-based data, web browsers, cameras, microphones, global positioning satellite (GPS) receivers. As appreciated, a contextually-aware system may gather data through these and other sources and respond according to pre-established rules or through computational intelligence. Such a system may also base responses on assumptions about context. For user applications, context awareness can guide services and enable enhanced experiences including augmented reality, context-relevant information delivery, and contextual marketing messages.

At step 402, the source node 10 receives data packets. As discussed above, the data packets may include any form of content or media (e.g., audio, image or video data), such as textual documents, video frames, speech, pictures, etc.

As data packets are generated or received at the source node 110, the source node 110 checks the incoming data packets to determine whether a matching data packet is stored in storage 116 (or memory 118) of the source node 110, at step 404. In one embodiment, data packets match when data contained in the payload of the data packets are the same or similar (e.g., a defined probability of matching) to each other. For example, matching means the data in the data packets represent the same or similar context information (data), knowledge, or wisdom ("DIKW"). Data matching may include, but is not limited to, matching distribution data bytes or bits, image scenes, speech contents, material contexts, mathematical formulas, physical interactions, chemical reactions, biological representations, etc.

In a further embodiment, the data packets arriving at the source node 110 may include a signature. The signature may be used to identify a particular incoming data packet.

Likewise, data packets previously received and stored at the source node 110 may include identifying signatures. For data packets having signatures, the data packets may be matched by determining that the incoming data packet has the same or similar (the data in the data packet has a defined probability of matching) signature as the data packet stored at the source node 110. In the case of a similar signature, the data in the data packets are approximately the same within a defined probability of matching or within a margin of error. In one embodiment, the signature may be generated, for example, using any well-known technique, such as a key value pair.

Referring to FIG. 4B, showing an incoming data packet 416 and a table of data packets 413 stored at the source node 110, the source node 110 compares the signature of the incoming data packet 416 (e.g., data packet 1) to the signatures (e.g., signatures 2, 3 . . . n) of the data packets (e.g., data packets 2, 3 . . . n) stored in a data table 418. If the signature 1 of the incoming data packet 416 matches any of the signatures 2, 3 . . . n of the corresponding data packets 2, 3 . . . n in the data table 413, the contextual information (Contextual Info 1, 2, . . . n) of the stored data packet with the matching signature is retrieved from storage at step 414. In the illustrated example, the signature 1 of data packet 1 matches the signature 1 of data packet 3. Accordingly, the contextual information 3 associated with data packet 3 is retrieved from storage.

In one embodiment, the table of received data packets 413 stores the previously received data packets and the corresponding contextual information and signature, as shown. In another embodiment, the table 418 stores the contextual information and the signature corresponding to a particular data packet, without storing the data packet itself.

Turning back to FIG. 4A, if the signature 1 of the incoming data packet 416 does not match any of the signatures 2, 3 . . . n of the corresponding data packets 2, 3 . . . n in the table 418, contextual information is generated (pre-computed) by the source node 110 using metadata in the incoming data packet, at step 406. For example, the incoming data packet 416 may be examined by the source node 110 to determine the metadata associated with the content and identify the contextual information associated with the content from the metadata. In one embodiment, the contextual information may be generated from the content and metadata of the incoming data packet 416 by translating the content using, for example, a speech-to-text or computer vision and encoding methodology. For example, a speech-to-text (S2T) system may use one or more language models to recognize text from speech utterances, or a speech recognition engine and natural language processing engine to transcribe speech to text. On the other hand, a text-to-speech (T2S) system may take text as an input and convert it to synthesized speech as output. In another example, a computer vision methodology may be used to translate data packets into contextual information. The translation may be performed according to any number of different techniques including, but not limited to, image classification, object detection, object tracking, semantic segmentation, instance segmentation, and image reconstruction.

In one example, and before translation, the content of a data packet (e.g., media file) arriving at the source node 110 may contain digitized voice or speech streams in mp3 format. The source node 110 examines or analyzes the content to extract the contextual information using metadata and attributes that characterize them metadata. Metadata may include, for example, the name of an audio file for the digitized voice or speech streams, a timestamp of when the digitized content was generated, access history of the digitized content, etc. Using an S2T technique and the metadata, the source node 110 generates an output as the contextual information. For example, the contextual information may include the title and abstract of the digitized voice or speech in ASCI text format.

In another example, and before translation, the content of the data packet arriving at the source node 110 may contain video streams in mp4 format. The source node 110 examines or analyzes the content to extract the contextual information using metadata. In this case, the metadata may include the file name of the video file, the timestamp of when the video was created, the access history of the video, and relationships to other content. Using, for example, a computer vision technique and the metadata, the source node 110 generates an output as the contextual information. For example, the contextual information may include the title and summary of the video in ASCII text format.

In still another example, and before translation, the content of the data packet arriving at the source node 110 may contain textual content, such as an encyclopedia, user manual, or novel. The source node 110 examines or analyzes the content to extract the contextual information using metadata. In this case, the metadata may include the name of the content, a username, etc. The source node 110 generates an output, using for example a context-aware text recognition system, as the contextual information. For example, the contextual information may include the title and the author of the material in ASCII text format.

In other examples, the data packet may include data such as a music file, a text document, or a webpage. In the case of a music file, the generating of the contextual information (e.g., an audio summary) can involve examining the metadata of the music file (typically contained in the file headers) and converting some or all of the metadata to audio. In the case of a text file, the generating of the contextual information can include parsing the document to determine the author and title of the document. Further, in the case of the text file, the generating of the contextual information can include identifying abstract or summary text and including audio for such text in the audio summary. In the case of a webpage, generation of the contextual information can include parsing the webpage for metadata, identifying title, author and/or abstract information for the webpage.

The contextual information generated by the source node 110 may then be used to later reconstruct the data packet at a destination node 112 receiving the contextual information, as explained below with reference to FIG. 4C.

Once the contextual information has been retrieved from storage at step 414, or generated by the source node 110 using metadata in the content at step 406, the process proceeds to step 408 where data packets are paired with the contextual information. More specifically, each of the incoming data packets and the corresponding contextual information is paired for transmission to a destination node, such as destination node 112. The pairing allows for parallel (and simultaneous) dispatch of the data packet and the corresponding contextual information across various data paths. In one embodiment, the data packet is transmitted across a first data path and the contextual information is transmitted across a second data path, in which the first data path has a longer time of flight (ToF) compared to the second data path. In this case, the ToF represents the latency or delay along a data path. For example, the contextual information is transmitted over a low latency, low throughput network, such as an aerial data path including, but not limited to, a wireless network using LEO satellites described with reference to FIG. 2, whereas the data packet is transmitted over a high latency, high throughput network, such as a terrestrial data path including, but not limited to, a wired network using fiber optic cables as described in FIG. 1 (also shown in FIG. 2). Thus, the ToF of the first data path, which has a lower latency/delay, is smaller compared to the ToF of the second data path, which has a higher latency/delay.

At step 410, the contextual information generated by the source node 110 at step 406 is stored in the table of received data packets 418 (FIG. 4B). As noted above, the contextual information is stored with the corresponding data packet's signature and/or the data packet for retrieval by the source node 110 when a signature of an incoming data packet 416 matches a signature in the table of received data packets 418. In one embodiment, storing the contextual information at the source node 110 enables the source node to retrieve the contextual information associated with an incoming data packet 416 without having to first generate the contextual information, thereby eliminating time-consuming pre-computation. It is also appreciated that while the contextual information is shown as being stored in a table, any number of different storage methods may be employed, and the disclosure is not limited to storage in a table format.

The data packets and corresponding contextual information are then transmitted to a destination node 112, as step 412, over the data paths identified in step 408. For example, the contextual information is sent over a first data path that has low latency, low throughput, and the corresponding data packet is sent over a second data path that has high latency, high throughput compared to the first data path.

In one example of a global transmission from a source node 110 to a destination node 112, the source in the United Kingdom wants to communicate with the destination in the U.S.A. The source node 110 sends a communication to the destination node 112. The global communication system 200 receives the communication at a source ground station 204 and determines the data paths (first and second data paths) leading to the destination ground station 206, as explained above. In one embodiment, the contextual information (as determined by the source node 110) is transmitted over the first data path, and the raw data packet corresponding to the contextual information is transmitted over a second data path. For example, the first data path may consist of sending the contextual information from user 210 to user 212 via a constellation of satellites 202, and the second data path may consist of sending the raw data packet corresponding to the contextual information via system 100. In some examples, the source ground station 204 receives the communication from a user 210 through a cabled or fiber-optic connection. In other examples, the source ground station 204 receives the communication through a wireless radio-frequency communication. Similarly, the destination ground station 206 may transmit the communication to the user 212 through cables or fiber-optic connection, or through a wireless radio-frequency communication. Other examples are possible as well, such as free-space optical communications or combinations of free-space optical, cabled, wireless radio-frequency, and fiber optic communications between users 210 and 212 and the gateways (e.g., source ground destination 204 and destination ground stations 206).

Figure 4C:
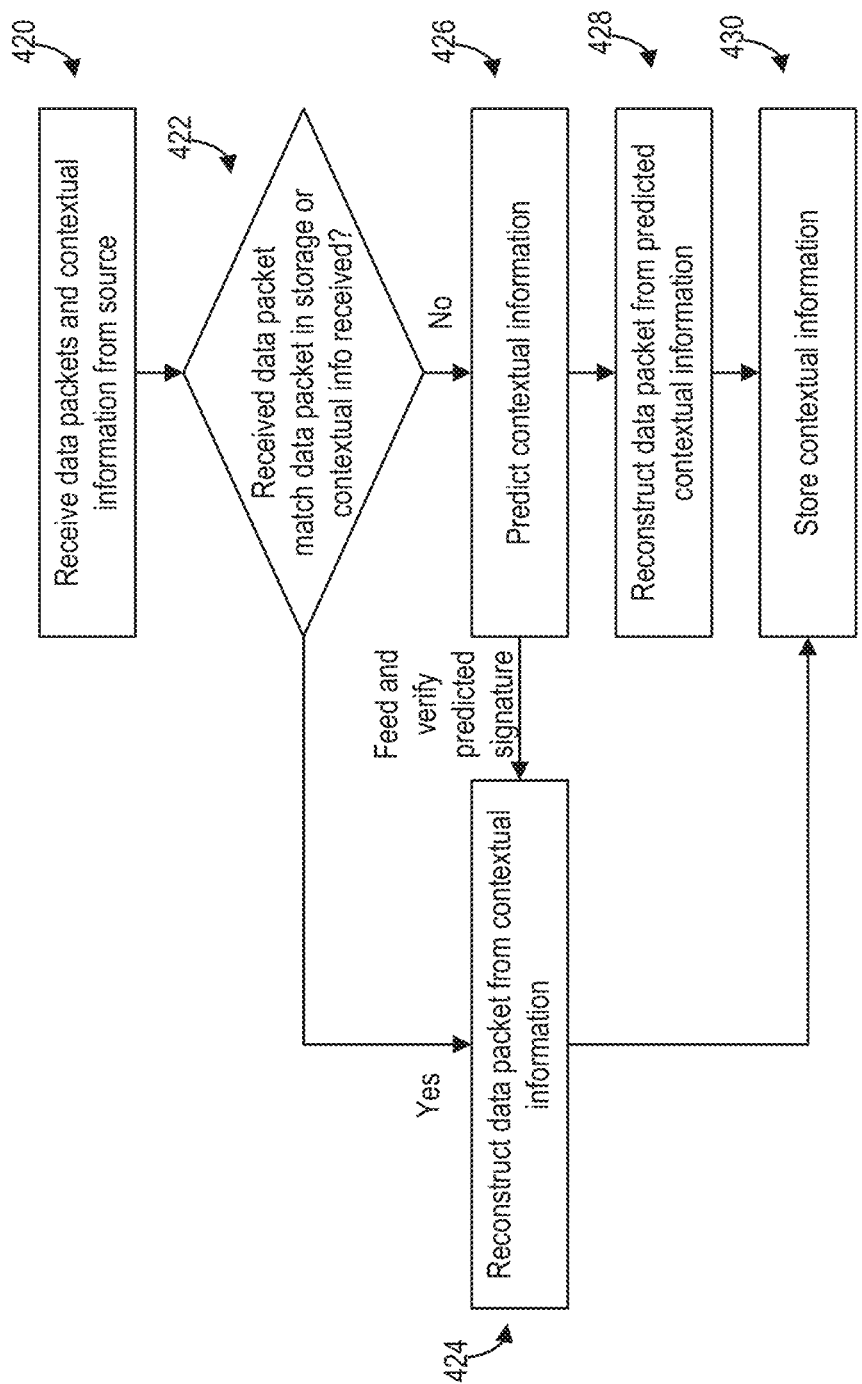
FIG. 4C illustrates an example flow chart of predicting contextual information at a destination device.

FIG. 4C illustrates an example flow chart of predicting contextual information at a destination device. In the discussion that follows, the destination node 112, including processor 114, performs the procedures. However, it is appreciated that any other functional unit or processing unit may implement the processes described herein, and the disclosure is not limited to implementation by the destination node and processor.

At step 420, the destination node 112 receives data packets (e.g., a media file) and contextual information from a source node, such as source node 110. The data packets are received over a first data path, and the contextual information is received over a second data path, where the latency over the first data path is greater than the latency over the second data path (as described above). In one embodiment, the first data path has high throughput and high latency, and the second data path has low throughput and low latency. For example, the contextual information is received over an aerial data path, such as a wireless low-latency network, and the data packets are received over a terrestrial data path, such as a high-latency fiber-optic network, as described above.

Since the contextual information and the data packets are sent by the source network 110 over different data paths with different latency and throughput, there may be a transmission gap in the time between receipt of the contextual information and the corresponding data packet at the destination node 112. For example, the transmission gap may be determined by a difference between the ToF of a first data packet across a first data path and a second data packet across a second data path. In a first embodiment, the transmission gap is a result of the contextual information being transmitted over a lower latency network (higher speed) with an amount of data in the contextual information being less than the amount of data in the data packet (transmitted over a higher latency network). In a second embodiment, the transmission gap is a result of generating the contextual information at the source node 110 and delivery to the destination node 112 due to the laws of physics-even at the speed of light, data is still delayed when transmitted over long distances (e.g., the transmission of data across the globe). In either case, the contextual information typically arrives before the data packets at the destination node 112, causing a transmission gap between the higher speed (low latency) data path and the lower speed (high latency) data path. To resolve this transmission gap, contextual information prediction and transmission gap elimination at the destination node 112 may be performed.

At step 422, the destination node 112 determines whether the received data packets match any data packets stored in storage 116 (or memory 118) of the destination node 112, or whether contextual information has been received for a data packet that has not yet arrived at the destination source 112. In the latter case, the destination node 112 determines whether contextual information has arrived before the arrival of the corresponding data packet. If the received packet matches a data packet stored in storage 116 (or memory 118) at the destination node 112 or the contextual information arrives before the corresponding data packet, then the process proceeds to step 424. If the received packet does not match a data packet stored in storage 116, and no contextual information has arrived at the destination node 112, then the process proceeds to step 426.

At step 424, data packet reconstruction is initiated using the contextual information retrieved from storage at the destination node 112 or the contextual information received at the destination node 112. For example, in one embodiment, the data packet may be reconstructed (or partially reconstructed) from the corresponding contextual information at the destination node 112 using, for example, a text-to-speech or computer graphics and decoding methodology. In general, reconstruction of a data packet from an abstraction of the data (contextual information) requires multi-dimensional enrichment to the original data. For example, the text of a speech is obtained together with the speaker's speech metadata, which characterizes attributes such as voice frequency spectrum, tone, accent, etc. A computer can "mimic" the speaker's speech by reading out the text based on the speaker's speech metadata characterization. When applied to images or videos, a pose model of an object (such as a person) may be obtained based on metadata characterizations, such as facial, body, clothing, etc., a full image or video can be computed and reconstructed.

In still another example, a text-to-speech (T2S) system may take text as an input and convert it to a synthesized speech as output. In another example, a computer graphics and decoding methodology may be used to reconstruct contextual information into data carried by the data packets. The reconstruction may be performed according to any number of different techniques including, but not limited to, image classification, object detection, object tracking, semantic segmentation, instance segmentation, and image reconstruction. For example, a reconstruction algorithm may want to reconstruct a three-dimensional model from images expressed in the data of the contextual information. More specifically, in one example, images (or a sequence of images) represent an object taken from different viewing angles. A reconstructed representation of the object, based on the contextual information (e.g., images of the object), may be output by a computing device using machine learning (e.g., processing the image with a neural network).

On the other hand, if the destination node 112 has not received contextual information transmitted from the source node 110 (and no contextual information has been stored), then the destination node 112 predicts the contextual information, at step 428. In this case, the destination node 112 predicts the contextual information using, for example, the Manhattan distance. In one embodiment, machine learning calculates a distance metric using the Manhattan distance methodology. The Manhattan distance is one example embodiment of "predicting" the next incoming contextual information, assuming there are no sudden changes in the data. Other techniques such as the Markov Decision process using Markovian statistical methods to predict the next instance in time series is another example. Further, principles in physics, such as Newton's Law; chemistry, such as entropy and energy conservation; and math, such as axioms in geometry; can also assist in "predicting." It is appreciated that other techniques exist to aid in predicting the next step before it occurs, and the disclosure is not limited to the discussed embodiments. In one embodiment, if contextual information arrives during the prediction, then the predicted contextual information is preempted by the received contextual information and used to reconstruct the contextual information similar to the reconstruction in step 424.

At step 428, the reconstruction process is initiated and is similar to the reconstruction process at step 424. However, instead of using contextual information retrieved from storage or received at the destination node 112, the destination node 112 uses the contextual information predicted at step 426.

At step 430, whether the reconstruction of data occurs at step 424 or step 428, the contextual information generated by the destination node 112 is stored in the table of received data packets 418 (FIG. 4B). As noted above, the contextual information is stored with the corresponding data packet's signature and/or the data packet for later retrieval by the source node 110.

Figure 5:
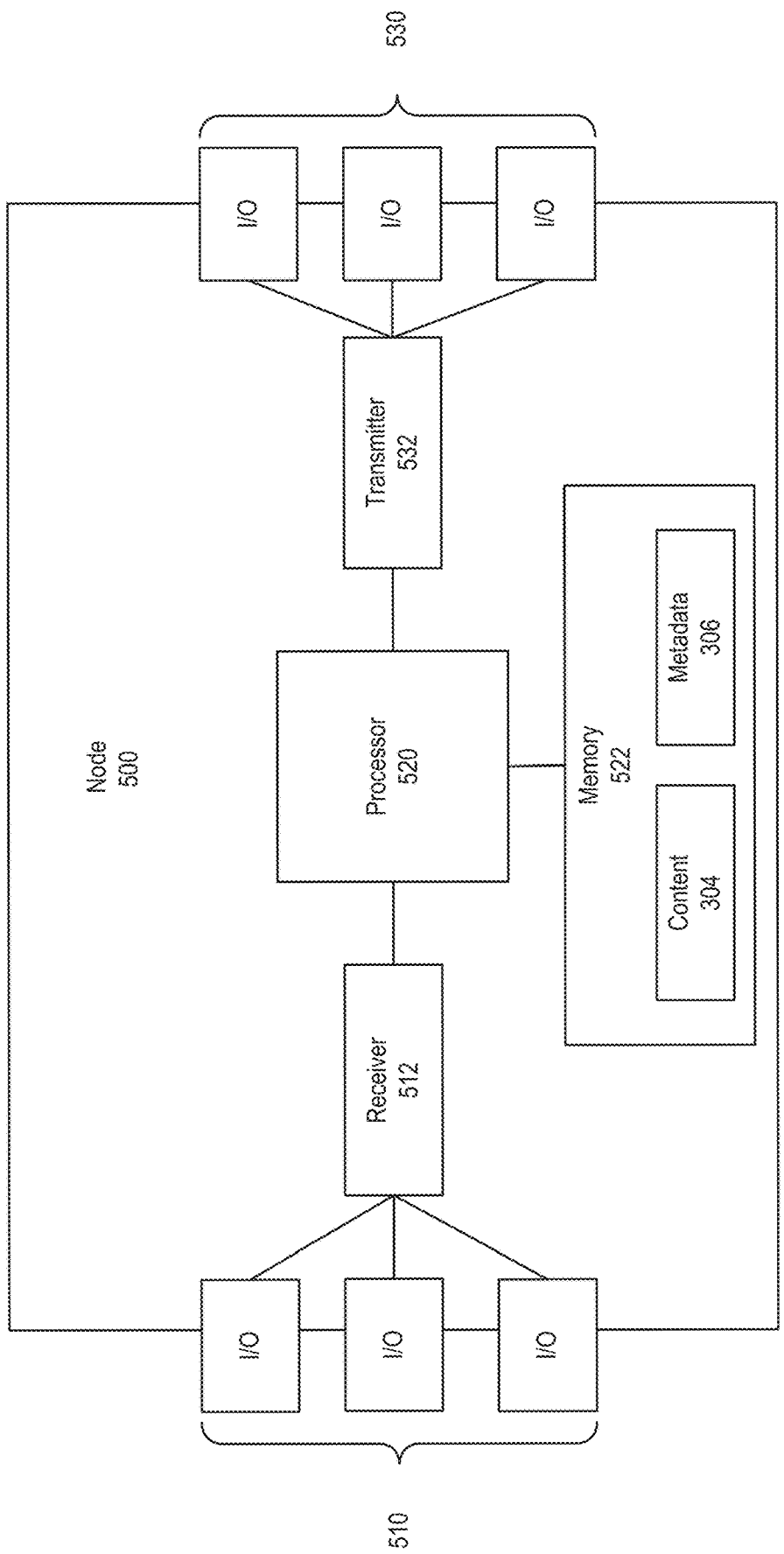
FIG. 5 illustrates an embodiment of a network node.

FIG. 5 illustrates an embodiment of a network node. The node (e.g., a client device or server) 500 may be, for example, a source node 110, a destination node 112, or any other network component as described above in system 100 or 200. The node 500 may comprise a plurality of input/output ports 510/530 and/or receivers (Rx) 512 and transmitters (Tx) 532 for receiving and transmitting data from other nodes, a processor 520 to process data and determine which node to send the data to and memory. The node 500 may also generate and distribute data in the form of data packets in the communication system. Although illustrated as a single processor, the processor 520 is not so limited and may comprise multiple processors. The processor 520 may be implemented as one or more central processing unit (CPU) chips, cores (e.g., a multi-core processor), field-programmable gate arrays (FPGAs), application-specific integrated circuits (ASICs), and/or digital signal processors (DSPs), and/or may be part of one or more ASICs. Moreover, the processor 520 may be implemented using hardware, software, or both. The memory 522 may be configured to store routing tables, forwarding tables, or other tables or information disclosed herein. Although illustrated as a single memory, memory 522 may be implemented as a combination of read-only memory (ROM), random access memory (RAM), or secondary storage (e.g., one or more disk drives or tape drives used for non-volatile storage of data). In one embodiment, the memory 522 stores content 304 and metadata 306. The technology described above may also be implemented on any general-purpose network component, such as a computer or network component with sufficient processing power, memory resources, and network throughput capability to handle the necessary workload placed upon it.

Figure 6:
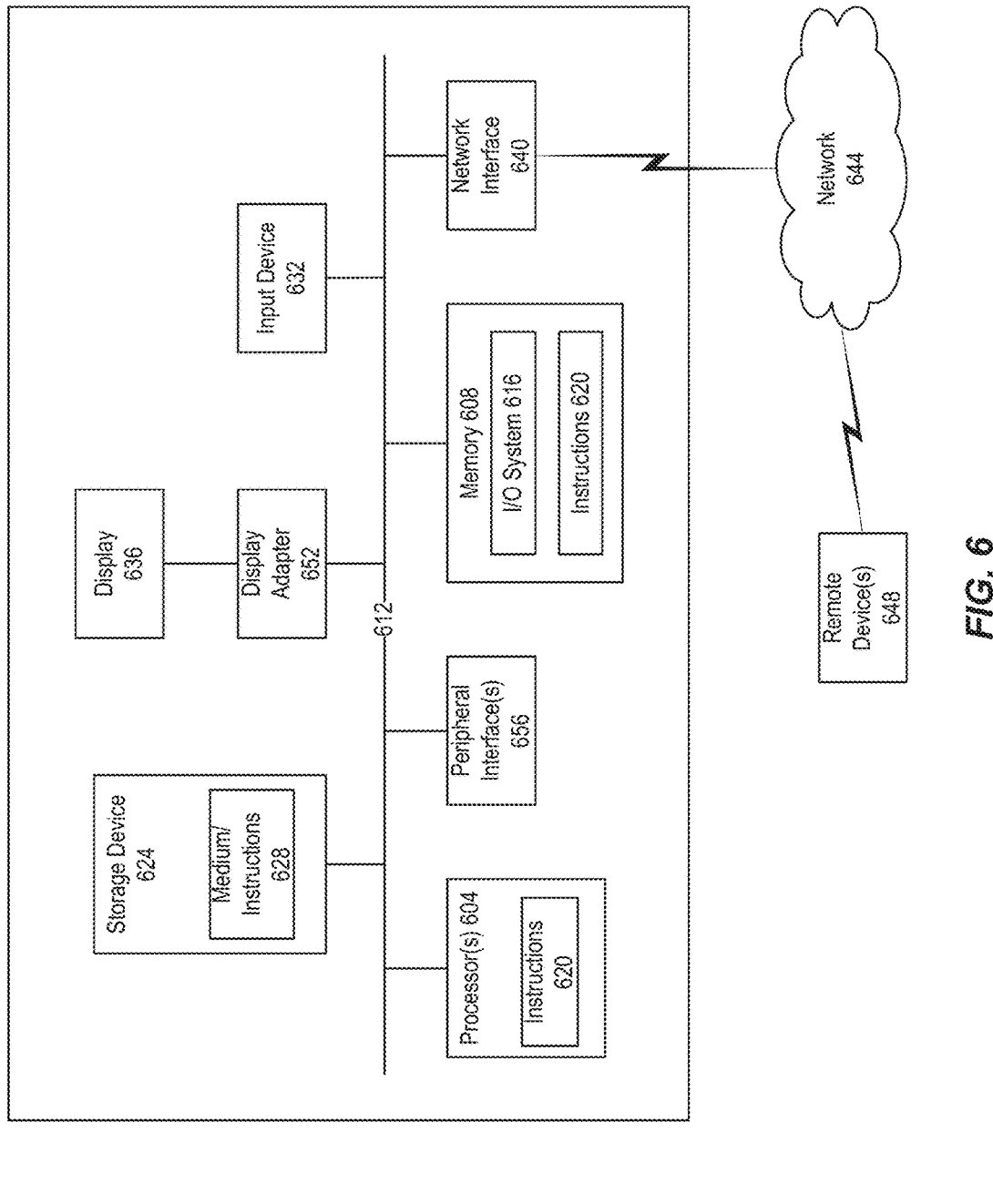
FIG. 6 illustrates a schematic diagram of a general-purpose network component or computer system.

FIG. 6 shows an example embodiment of a computing system for implementing embodiments of the disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read-only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, instructions 620 may reside, completely or partially, within machine-readable medium 628. In another example, instructions 620 may reside, completely or partially, within processor 604.

Computer system 600 may also include an input device 632. In one example, a user of computer system 600 may enter commands and/or other information into computer system 600 via input device 632. Examples of an input device 632 includes, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 643 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, instructions 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The non-transitory computer-readable media includes all types of computer readable media, including magnetic storage media, optical storage media, and solid-state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of communication in a communications network, comprising:
    receiving, by a source node, at least a portion of a first media file from a client device in the communications network, the first media file including audio and/or video data;
    obtaining, by the source node, contextual information that is descriptive of content in the audio and/or video data of the media file, by determining whether a match to the media file is located in storage
        for a media file for which a match is located in storage, accessing the contextual information when a match to the media file is found in storage at the source node; and
        for a media file for which a match is not located in storage, predicting the contextual information using one or more contextual prediction methodologies including extracting attributes from metadata in the media file; and
    transmitting, by the source node to a destination node, the media file over a first data path and the contextual information over a second data path, wherein the first data path has a higher latency than the second data path such that the contextual information arrives at the destination node prior to the media file.

2. The computer-implemented method of claim 1, wherein the obtaining comprises determining whether the media file received at the source node matches a second media file previously received at the source node,
    when the media file matches the second media file, accessing the contextual information, and
    when the media file does not match the second media file, generating the contextual information.

3. The computer-implemented method of claim 2, wherein the media file includes a first signature, and the second media file includes a second signature;
    the accessing further comprising:
        comparing, by the source node, the first signature to the second signature;
        determining, by the source node, the media file matches the second media file when the first signature matches the second signature; and
    retrieving the contextual information from storage at the source node when the first signature matches the second signature.

4. The computer-implemented method of claim 1, further comprising storing the contextual information in the storage at the source node.

5. The computer-implemented method of claim 1, further comprising pairing, by the source node, the media file and the contextual information for simultaneous transmittal across the first data path and the second data path.

6. The computer-implemented method of claim 1, wherein the first data path includes a terrestrial data path and the second data path includes an aerial data path.

7. The computer-implemented method of claim 6, wherein
    the aerial data path comprises a source ground station,
    a constellation of communication devices orbiting earth and in communication with the source ground station, and
    a destination ground station in communication with the constellation of communication devices orbiting the earth in which to receive the contextual information transmitted from the source node.

8. A computer-implemented method of communication in a communications network, comprising:
    receiving, by a destination node, a media file and contextual information from a source node in the communications network, the media file including audio and/or video data and received over a first data path and the contextual information received over a second data path, wherein the first data path has a higher latency than the second data path such that the contextual information arrives prior to the media file;
    determining whether a match to the media file is located in storage;
        for a media file for which contextual information is received but a match of the media file is not located in storage, reconstructing, by the destination node, the media file based on the contextual information obtained from storage at the destination node or the contextual information received over the second data path using one or more contextual prediction methodologies; or
        for a media file for which contextual information has not been received or stored, predicting, by the destination node, contextual information in the media file by generating the contextual information by extracting attributes from metadata in the media file and reconstructing the media file based on the generated contextual information; and
    transmitting, by the destination node, the reconstructed media file to a client device.

9. The computer-implemented method of claim 8, further comprising determining whether the media file received at the destination node matches a second media file previously received at the destination node,
    when the media file matches the second media file, reconstructing the media file, and when the media file does not match the second media file, generating the contextual information and reconstructing the media file.

10. The computer-implemented method of claim 9, wherein the media file includes a first signature, and the second media file includes a second signature;
wherein obtaining the contextual information from storage comprises:
comparing, by the destination node, the first signature to the second signature;
determining, by the destination node, the media file matches the second media file when the first signature matches the second signature; and
retrieving the contextual information from the storage at the destination node when the first signature matches the second signature.

11. The computer-implemented method of claim 8, wherein the generating further includes calculating, using machine learning, a distance metric using a Manhattan distance methodology to generate the contextual information.

12. The computer-implemented method of claim 8, wherein the first data path has high throughput and high latency, and the second data path has low throughput and low latency.

13. The computer-implemented method of claim 8, wherein the first data path includes a terrestrial data path, and the second data path includes an aerial data path.

14. The computer-implemented method of claim 13, wherein
the aerial data path comprises a source ground station,
a constellation of communication devices orbiting earth and in communication with the source ground station, and
a destination ground station in communication with the constellation of communication devices orbiting the earth in which to receive the contextual information transmitted from the source node.

15. A non-transitory computer-readable medium storing computer instructions at a source node for communicating in a communications network, that when executed by one or more processors, cause the one or more processors to perform the steps of:
receiving at least a portion of a media file from a client device in the communications network, the media file including audio and/or video data;
obtaining contextual information that is descriptive of content in the audio and/or video data of the media file, by determining whether a match to the media file is located in storage and
for a media file for which a match is located in storage, accessing the contextual information when a match to the media file is found in storage at the source node; or
for a media file for which a match is not located in storage, predicting the contextual information using one or more contextual prediction methodologies including extracting attributes from metadata in the media file; and
transmitting, to a destination node, the media file over a first data path and the contextual information over a second data path, wherein the first data path has a higher latency than the second data path such that the contextual information arrives at the destination node prior to the media file.

16. The non-transitory computer-readable medium of claim 15, wherein the obtaining further causes the one or more processors to perform the step of determining whether the media file received at the source node matches a second media file previously received at the source node,
when the media file matches the second media file, accessing the contextual information, and
when the media file does not match the second media file, generating the contextual information.

17. The non-transitory computer-readable medium of claim 16, wherein the media file includes a first signature, and the second media file includes a second signature;
the accessing further causing the one or more processors to perform the steps of:
comparing the first signature to the second signature;
determining the media file matches the second media file when the first signature matches the second signature; and
retrieving the contextual information from storage at the source node when the first signature matches the second signature.

18. The non-transitory computer-readable medium of claim 15, further causes the one or more processors to perform the step of pairing the media file and the contextual information for simultaneous transmittal across the first data path and the second data path.

19. The non-transitory computer-readable medium of claim 15, wherein the first data path has high throughput and high latency, and the second data path has low throughput and low latency.

20. The non-transitory computer-readable medium of claim 19, wherein first data path includes a terrestrial data path, and the second data path includes an aerial data path.

* * * * *